(12) United States Patent
Sasai et al.

(10) Patent No.: US 9,095,997 B2
(45) Date of Patent: *Aug. 4, 2015

(54) MULTI-LAYER POLYESTER CONTAINER AND METHOD OF PRODUCING THE SAME

(75) Inventors: Misa Sasai, Kanagawa (JP); Atsushi Kikuchi, Kanagawa (JP); Toshiki Yamada, Kanagawa (JP)

(73) Assignee: TOYO SEIKAN KAISHA, LTD., Tokyo (JP)

( * ) Notice: Subject to any disclaimer, the term of this patent is extended or adjusted under 35 U.S.C. 154(b) by 307 days.

This patent is subject to a terminal disclaimer.

(21) Appl. No.: 12/530,118

(22) PCT Filed: Mar. 22, 2007

(86) PCT No.: PCT/JP2007/056743
§ 371 (c)(1),
(2), (4) Date: Sep. 4, 2009

(87) PCT Pub. No.: WO2008/117474
PCT Pub. Date: Oct. 2, 2008

(65) Prior Publication Data
US 2010/0129577 A1    May 27, 2010

(51) Int. Cl.
*B32B 1/02* (2006.01)
*B29C 49/00* (2006.01)
(Continued)

(52) U.S. Cl.
CPC .............. B29C 49/0005 (2013.01); B23B 27/08 (2013.01); B32B 1/02 (2013.01);
(Continued)

(58) Field of Classification Search
CPC .............. B29B 2911/1416; B29B 2911/14126; B29B 2911/1424; B29B 2911/1429; B29B 2911/14133; B29C 2049/4638; B29C 49/0005; B29C 49/08; B29K 2067/00; B29K 49/08; B29K 49/221; B32B 1/02; B32B 27/32; B32B 27/36; B32B 27/30; B65D 1/0215; Y10T 428/1352; Y10T 428/1383

USPC ................................ 428/36.7, 35.7; 264/512
See application file for complete search history.

(56) References Cited

U.S. PATENT DOCUMENTS

| 5,766,751 A | 6/1998 | Kotani et al. |
| 6,012,597 A * | 1/2000 | Nishihara et al. ............. 215/398 |

(Continued)

FOREIGN PATENT DOCUMENTS

| JP | 53-108162 A | 9/1978 |
| JP | 63-189225 A | 4/1988 |

(Continued)

OTHER PUBLICATIONS

China Office action that issued with respect to patent family member Chinese Patent Application No. 200780052281.3, dated Dec. 13, 2011 along with an english translation thereof.

(Continued)

*Primary Examiner* — Erik Kashnikow
(74) *Attorney, Agent, or Firm* — Greenblum & Bernstein, P.L.C.

(57) ABSTRACT

A multi-layer polyester container comprising inner and outer layers of a polyester resin and at least one intermediate layer of a functional resin or a functional resin composition, wherein a difference of tan δ of the inner polyester layer at 80° C. and 60° C. is 0.035 or less in the measurement of the dynamic viscoelasticity (DMS) thereof at 0.5 Hz. Even when the functional resin or the functional resin composition having a large draw stress is used as an intermediate layer, therefore, excellent transparency is obtained while effectively exhibiting the function such as barrier property possessed by the functional resin or the functional resin composition.

10 Claims, 1 Drawing Sheet

(51) Int. Cl.
  B23B 27/08 (2006.01)
  B32B 27/30 (2006.01)
  B32B 27/36 (2006.01)
  B65D 1/02 (2006.01)
  B29C 49/04 (2006.01)
  B29C 49/06 (2006.01)
  B29C 49/08 (2006.01)
  B29C 49/12 (2006.01)
  B29C 49/22 (2006.01)
  B29C 51/00 (2006.01)
  B29C 51/04 (2006.01)
  B29C 51/10 (2006.01)
  B29C 49/46 (2006.01)
  B29K 67/00 (2006.01)

(52) U.S. Cl.
  CPC ............... B32B 27/30 (2013.01); B32B 27/36 (2013.01); B65D 1/0215 (2013.01); B29B 2911/1402 (2013.01); B29B 2911/1404 (2013.01); B29B 2911/1408 (2013.01); B29B 2911/1412 (2013.01); B29B 2911/1414 (2013.01); B29B 2911/1418 (2013.01); B29B 2911/14026 (2013.01); B29B 2911/14033 (2013.01); B29B 2911/14053 (2013.01); B29B 2911/14066 (2013.01); B29B 2911/14093 (2013.01); B29B 2911/14106 (2013.01); B29B 2911/14113 (2013.01); B29B 2911/14126 (2013.01); B29B 2911/14133 (2013.01); B29B 2911/14146 (2013.01); B29B 2911/14153 (2013.01); B29B 2911/14173 (2013.01); B29B 2911/14226 (2013.01); B29B 2911/14233 (2013.01); B29B 2911/14313 (2013.01); B29C 49/04 (2013.01); B29C 49/06 (2013.01); B29C 49/08 (2013.01); B29C 49/12 (2013.01); B29C 49/221 (2013.01); B29C 51/002 (2013.01); B29C 51/04 (2013.01); B29C 51/10 (2013.01); B29C 2049/4638 (2013.01); B29K 2067/00 (2013.01); B29K 2995/0026 (2013.01); Y10T 428/1352 (2015.01); Y10T 428/1383 (2015.01)

(56) References Cited

U.S. PATENT DOCUMENTS

| | | | |
|---|---|---|---|
| 6,350,822 B1 * | 2/2002 | Van Diepen et al. | 525/444 |
| 7,265,187 B2 | 9/2007 | Mitadera et al. | |
| 2002/0098310 A1 * | 7/2002 | Kikuchi et al. | 428/36.91 |
| 2004/0068037 A1 * | 4/2004 | Mitadera et al. | 524/445 |
| 2004/0224112 A1 | 11/2004 | Maruyama et al. | |
| 2009/0061132 A1 | 3/2009 | Yamada et al. | |

FOREIGN PATENT DOCUMENTS

| | | |
|---|---|---|
| JP | 2917851 | 10/1996 |
| JP | 2003-033964 A | 2/2003 |
| JP | 2004-142444 | 5/2004 |
| JP | 2006-297873 A | 11/2006 |
| JP | 2006-306452 A | 11/2006 |
| JP | 2007-099360 A | 4/2007 |
| WO | 2006/033964 A | 3/2006 |
| WO | WO 2006/115287 | 11/2006 |

OTHER PUBLICATIONS

Office Action issued in Korean patent application No. 10-2009-7020069 on Jul. 19, 2013.

* cited by examiner 1　　3　　2

3a　　3b
1　　　4　　2

MULTI-LAYER POLYESTER CONTAINER AND METHOD OF PRODUCING THE SAME

TECHNICAL FIELD

The present invention relates to a multi-layer container having an intermediate layer of a functional resin. More specifically, the invention relates to a multi-layer polyester container featuring excellent transparency and barrier property even by using a functional resin having a large draw stress as an intermediate layer and to a method of producing the same.

BACKGROUND ART

In order to improve the preservability of content of plastic packing containers, it has heretofore been an accepted practice to form the container wall in a multi-layer structure using a polyester resin as the inner and outer layers, and using, as an intermediate layer, a functional resin such as an ethylene/vinyl alcohol copolymer or a xylylene group-containing polyamide resin for improving gas-barrier property or a cyclic olefin copolymer for improving water vapor (water)-barrier property.

In order to further improve the function such as gas-barrier property or to further impart any other function, it is also a practice to blend a functional resin with an inorganic filler or any other resin composition. For example, JP-A-2004-142944 discloses blending a xylylene group-containing polyamide with a surface modified clay in order to further improve the gas-barrier property of the xylylene group-containing polyamide resin.

DISCLOSURE OF THE INVENTION

If the biaxial stretch-blow molding is conducted under the same conditions as those for the single-layer polyester bottle using the above functional resin as an intermediate layer, however, a problem occurs in that the lack generate in the intermediate layer due to the drawing, and voids of various sizes occur causing the transparency and barrier property to decrease.

Further, in the case of a multi-layer container obtained by stretch-blow-molding a resin composition of a xylylene group-containing polyamide blended with a surface modified clay as an intermediate layer between the inner layer and the outer layer of a polyester resin, there is exhibited such a drawing characteristic that a large load tends to occur at the time of drawing, imposing limitation on the drawing ratio and on the amount of using the resin composition blended with the surface modified clay and, therefore, imposing limitation on improving the gas-barrier property.

It is, therefore, an object of the present invention to provide a multi-layer polyester container featuring excellent transparency and barrier property even by using a functional resin or a functional resin composition having a large draw stress as an intermediate layer.

Another object of the present invention is to provide a method capable of forming a multi-layer polyester container without decreasing the functions such as transparency and barrier property when a functional resin or a functional resin composition having a large draw stress is used as the intermediate layer.

According to the present invention, there is provided a multi-layer polyester container comprising inner and outer layers of a polyester resin and at least one intermediate layer of a functional resin, wherein a difference of tan δ of the inner polyester layer at 80° C. and 60° C. is 0.035 or less in the measurement of the viscoelasticity thereof at 0.5 Hz.

In the multi-layer polyester container of the present invention, it is desired that:
1. The functional resin has a maximum value of draw stress of 50 N or more when an injection-molded plate thereof having a thickness of 1.5 mm is drawn at 115° C.;
2. The functional resin contains an ethylene/vinyl alcohol copolymer or a polymetaxylylene adipamide as a base resin;
3. The functional resin contains a clay dispersed therein; and
4. The functional resin is a cyclic olefin resin.

According to the present invention, there is further provided a method of producing a multi-layer polyester container by biaxially stretch-blow molding a multi-layer preform which comprises inner and outer layers of a polyester resin and at least one intermediate layer of a functional resin, wherein in conducting the biaxial stretch-blow molding, the multi-layer preform is heated at a temperature of 105 to 120° C., and the multi-layer preform is internally heated by using a heating rod heated at 300 to 600° C. and/or the hot air of 150 to 220° C.

In the method of producing a multi-layer polyester container of the present invention, there can be preferably used a functional resin having a maximum value of draw stress of 50 N or more when an injection-molded plate thereof having a thickness of 1.5 mm is drawn at 115° C.

In the multi-layer polyester container comprising inner and outer layers of a polyester resin and at least one intermediate layer of a functional resin of the present invention, occurrence of voids is suppressed owing to the drawing, and transparency and excellent functions are exhibited owing to the use of the functional resin.

According to the production method of the present invention, further, it is allowed to produce a multi-layer polyester container comprising inner and outer layers of a polyester resin and at least one intermediate layer of a functional resin without impairing transparency and excellent functions of the functional resin.

In the multi-layer polyester container comprising inner and outer layers of a polyester resin and at least one intermediate layer of a functional resin of the present invention, an important feature resides in that a difference of tan δ (loss tangent) of the inner polyester layer at 80° C. and 60° C. is 0.035 or less in the measurement of the viscoelasticity thereof at 0.5 Hz.

In the multi-layer polyester container comprising inner and outer layers of a polyester resin and at least one intermediate layer of a functional resin as described above, the functional resin constituting the intermediate layer usually has a draw stress which is higher than that of the polyester resin constituting the inner and outer layers. If the stretch-blow molding is conducted in the same manner as the molding for the ordinary multi-layer polyester containers, therefore, the drawing of the intermediate layer cannot follow up the drawing of the inner and outer layers. As a result, voids occur in the intermediate layer impairing the transparency. Besides, the function of the functional resin used as the intermediate layer is not exhibited to a sufficient degree.

According to the present invention, even by using the above functional resin as the intermediate layer, the difference of tan δ of the inner polyester layer at 80° C. and 60° C. is 0.035 or less in the measurement of the viscoelasticity thereof at 0.5 Hz, effectively preventing the occurrence of voids, and enabling the resin forming the transparent intermediate layer having barrier property to exhibit its inherent function to a sufficient degree.

The value of tan δ in the measurement of the viscoelasticity is a value obtained by dividing a loss modulus of elasticity E"

by a storage modulus of elasticity E', i.e., is a ratio of an amorphous portion that contributes to the loss component and the crystalline portion that contributes to the storage component. Therefore, a small absolute value thereof stands for a small strain caused by the drawing, and a small value of difference of tan δ at 80° C. and 60° C. stands for that the residual amount of strain is little dependent upon the temperature, and the strain is relaxed in this temperature zone.

The present invention uses the value of tan δ at 80° C. and 60° C. This is because, it was found through experiment that the values at the above temperature conspicuously express the feature of the invention.

In the present invention, it is important that the strain has been relaxed at the time of drawing in the intermediate layer of the functional resin that has a large draw stress. It is, therefore, ideal to measure the tan δ of the intermediate layer to make sure that the strain has been relaxed. Usually, however, the intermediate layer has a small thickness while the functional resin involves difficulty for correctly measuring its tan δ due to its properties such as high hygroscopic property. In conducting the biaxial stretch-blow molding according to the present invention, therefore, attention is given to the innermost polyester layer having the greatest drawing ratio in the direction of thickness of the container and having a large strain. When the strain has been relaxed to a sufficient degree in the innermost polyester layer, it is considered that the strain has been relaxed in the intermediate layer of the functional resin, too, as a matter of course. In fact, the inventors have measured the value of tan δ in the inner polyester layer, observed voids at that value in the intermediate layer, and have evaluated the functions such as transparency and barrier property. As a result, the inventors have discovered a correlation between the value of tan δ in the inner polyester layer and the degree of relaxing the strain in the intermediate layer.

In the biaxially stretch-blow molded container, further, the body portion is most drawn among other portions of the container and is little suited for measuring the effect of relaxation of strain. Therefore, the value of tan δ is better measured at a portion where the effect of relaxation of strain can be easily measured. It is, therefore, necessary to take a measurement near the ground surface or near the lower part of the neck and, particularly, near the lower part of the neck which has not been drawn too much.

The above action and effect of the multi-layer polyester container of the invention will become obvious from the results of Examples appearing later. That is, when the difference of tan δ of the inner polyester layer at 80° C. and 60° C. is larger than 0.035 in the measurement of the viscoelasticity thereof at 0.5 Hz, transparency and barrier property are lowered due to voids (Comparative Examples 1 to 5 and Comparative Examples 7 to 9). On the other hand, when the difference of tan δ is not larger than 0.035, excellent transparency and barrier property are exhibited (Examples 1 to 8).

BEST MODE FOR CARRYING OUT THE INVENTION

Functional Resin

Figure 1:
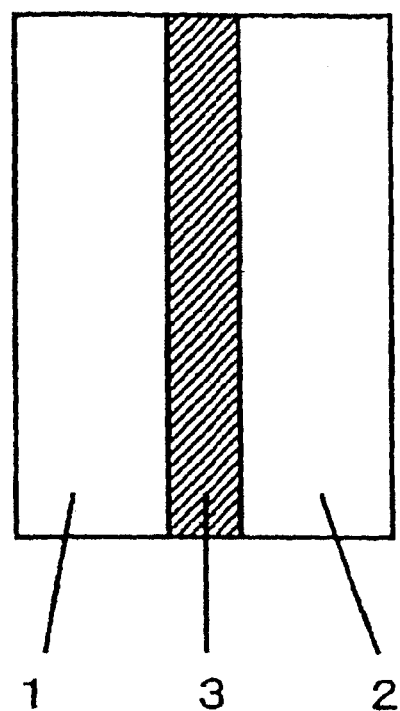
FIG. 1 is a view illustrating a sectional structure of a multi-layer polyester container of the present invention.

As the functional resin that constitutes the intermediate layer of the present invention, there can be used a known functional resin such as the one having gas-barrier property, water vapor-barrier property, oxygen-absorbing property or oxygen-absorbing gas-barrier property, or a resin composition using the functional resin as a matrix. In the present invention, in particular, there can be preferably used a functional resin having a maximum value of draw stress of 50 N or more of when an injection-molded plate thereof having a thickness of 1.5 mm is drawn at 115° C. The functional resin having a large draw stress easily develops voids when it is drawn and easily impairs the transparency and the function of the functional resin when drawn. The present invention, however, makes it possible to exhibit excellent transparency and function even when the functional resin having a large draw stress is used as the intermediate layer.

As the functional resin used for the intermediate layer in the present invention, there can be exemplified a polyamide resin which is a gas-barrier resin, such as polymetaxylylene adipamide or polymetaxylylene sebacamide, an ethylene/vinyl alcohol copolymer and a cyclic olefin resin which is a water vapor-barrier resin. All of these resins have maximum values of draw stress of 50 N or more as measured under the above-mentioned conditions and can be drawn with difficulty.

The above gas-barrier resin may contain an organic clay dispersed therein so as to be used as a layer of a gas-barrier resin composition, or may contain an oxidizable organic component and a transition metal catalyst together with the organic clay or without the organic clay so as to be used as a layer of an oxygen-absorbing gas-barrier resin composition. The functional resin composition blended with the organic clay and the like, usually, has a larger draw stress than when it comprises the functional resin alone and tends to impair the functions such as transparency and gas-barrier property due to the occurrence of voids.

The surface modified clay is the one obtained by treating the clay with an organizing agent so as to swell. The clay in the surface modified clay is mica, vermiculite or smectite and, preferably, is a laminar silicate of the 2-octahedral type or the 3-octaheral type having an electric charge density of 0.25 to 0.6. As the clay of the 2-octahedral type, there can be exemplified montmorillonite, beidellite and nontronite and as the clay of the 3-octahedral type, there can be exemplified hectorite and saponite. Among them, the montmorillonite highly swells due to the permeation of the organizing agent undergoing the expansion among the layers, and is particularly desired.

As the organizing agent, a quaternary ammonium salt is desirably used. More desirably, however, there can be used a quaternary ammonium salt having at least one or more alkyl groups with not less than 12 carbon atoms and, concretely, a trimethyldodecylammonium salt and a trimethyltetradecylammonium salt.

It is desired that the functional resin containing the surface modified clay is blended with the surface modified clay at a ratio of 1 to 10 parts by weight and, particularly, 1 to 8 parts by weight per 100 parts by weight of the functional resin. When the amount of the surface modified clay is smaller than the above range, the gas-barrier property is not obtained to a sufficient degree as compared to when the surface modified clay is blended in an amount in the above range. When the amount of the surface modified clay is larger than the above range, on the other hand, the formability becomes inferior to when the amount of the surface modified clay is within the above range, and is not desirable.

A combination of the oxidizable organic component and the transition metal catalyst may be the one that has heretofore been used for the oxygen-absorbing resin compositions. As the oxidizing organic component, there can be exemplified those having a functional group on a side chain or at a terminal and that can be oxidized. Concretely, there can be exemplified a polyene oligomer or a polymer modified with an acid or an acid anhydride, such as butadiene and butadiene modified with maleic anhydride. As the transition metal catalyst, there can be used a metal component of the Group VIII of periodic table, such as iron, cobalt, nickel, etc. though not limited thereto only, as a matter of course.

It is desired that the oxidizable organic component is blended in an amount of 2 to 10 parts by weight per 100 parts by weight of the functional resin. It is further desired that the transition metal catalyst is blended in an amount of at least 300 ppm calculated as a metal.

The functional resin used in the present invention can be further blended with known blending agents for resins, such as deoxidizing agent, filler, coloring agent, heat stabilizer, weather-proofing agent, antioxidizing agent, aging stabilizer, photo stabilizer, ultraviolet-ray absorber, antistatic agent, lubricant such as metal soap or wax, and reforming resin or rubber in addition to a combination of the above-mentioned organic clay, oxidizable component and transition metal catalyst according to known recipe within ranges in which they do not impair the object of the present invention.

(Polyester Resin)

The polyester resin used as the inner and outer layers of the invention may be a known polyester resin comprising a dicarboxylic acid component and a diol component.

As for the dicarboxylic acid component, it is desired that not less than 50% and, particularly, not less than 80% of the dicarboxylic acid is a terephthalic acid from the standpoint of mechanical properties and thermal properties. However, a carboxylic acid component other than the terephthalic acid may be contained, as a matter of course. As the carboxylic acid component other than the terephthalic acid, there can be exemplified isophthalic acid, naphthalenedicarboxylic acid, p-β-oxyethoxybenzoic acid, biphenyl-4,4'-dicarboxylic acid, diphenoxyethane-4,4'-dicarboxylic acid, 5-sodiumsulfoisophthalic acid, hexahydroterephthalic acid, adipic acid and sebacic acid.

As for the diol component, it is desired that not less than 50% and, particularly, not less than 80% of the diol component is an ethylene glycol from the standpoint of mechanical properties and thermal properties. As the diol component other than the ethylene glycol, there can be exemplified 1,4-butanediol, propylene glycol, neopentyl glycol, 1,6-hexylene glycol, diethylene glycol, triethylene glycol, cyclohexanedimethanol, ethylene oxide adduct of bisphenol A, glycerol and trimethylolpropane.

The dicarboxylic acid component and the diol component may contain trifunctional or more highly functional polybasic acid and polyhydric alcohol. Examples thereof include polybasic acids such as trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid, biphenyl-3,4,3',4'-tetracarboxylic acid, and polyhydric alcohols such as pentaerythritol, glycerol, trimethylolpropane, 1,2,6-hexanetriol, sorbitol, and 1,1,4,4-tetrakis(hydroxymethyl)cyclohexane.

It is desired that the polyester resin used as the inner and outer layers of the invention has an intrinsic viscosity in a range of 0.60 to 1.40 dL/g as measured by using a phenol/tetrachloroethane mixed solvent of a weight ratio of 1:1 at a temperature of 30° C. It is further desired that the polyester resin has a melting point (Tm) of 200 to 275° C. to improve the heat resistance and workability of the multi-layer container. It is further desired that the glass transition point is not lower than 30° C. and, particularly, in a range of 50 to 120° C.

The polyester resin used as the inner and outer layers of the invention can be blended with known blending agents for resins, such as coloring agent, antioxidizing agent, stabilizer, various antistatic agents, parting agent, lubricant and nucleating agent according to known recipe in amounts in a range in which they do not impair the quality of the finally formed body.

(Multi-Layer Polyester Container)

Figure 2:
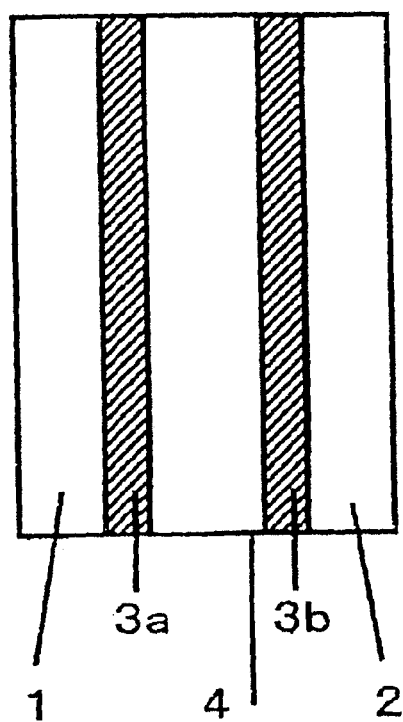
FIG. 2 is a view illustrating a sectional structure of a multi-layer polyester container of the present invention.

The multi-layer polyester container of the present invention may employ a variety of layer constitutions so far as it has at least an inner layer and an outer layer of a polyester resin, and an intermediate layer of a functional resin or of a functional resin composition using the functional resin as a base resin. As shown in FIG. 1, the layer constitution may comprise an intermediate layer 3 of the functional resin between an inner layer 1 and an outer layer 2 of the polyester resin. Or, as shown in FIG. 2, the layer constitution may comprise the inner layer 1 and the outer layer 2 of the polyester resin, and two intermediate layers 3a and 3b of the functional resin, one of which lying between the inner layer 1 of the polyester resin and an intermediate layer 4 of the polyester resin and the other of which lying between the outer layer 2 of the polyester resin and the intermediate layer 4 of the polyester resin.

In producing the multi-layer container, an adhesive resin may be interposed among the resin layers, which, however, is not usually required. As the adhesive resin, there can be exemplified carboxylic acid, carboxylic anhydride, carboxylate, carboxylic acid amide, and a thermoplastic resin containing a carbonyl (—CO—) group based on the carboxylic acid ester on a main chain or on a side chain at a concentration of 1 to 700 milliequivalent (meq) per 100 g of the resin and, particularly, at a concentration of 10 to 500 meq per 100 g of the resin. Preferred examples of the adhesive resin include ethylene/acrylic acid copolymer, ionically crosslinked olefin copolymer, maleic anhydride-grafted polyethylene, maleic anhydride-grafted polypropylene, acrylic acid-grafted polyolefin, ethylene/vinyl acetate copolymer and copolymerized polyester.

In the multi-layer container of the present invention, it is desired that the whole thickness of the body portion is in a range of 200 to 600 μm and, particularly, 240 to 500 μm though it may vary depending upon the volume (weight) of the container and the use of the container.

It is desired that the functional resin layer which is the intermediate layer has a thickness of not larger than 30 μm from the standpoint of transparency of the container and, particularly, in a range of 10 to 30 μm and that the intermediate layer is in a range of 3 to 15% of the whole thickness of the body portion.

When the intermediate layers of the functional resin are to be formed in a plural number, it is desired that each intermediate layer has a thickness of not larger than 25 μm and, particularly, in a range of 10 to 25 μm, and the intermediate layers as a whole are in a range of 3 to 25% of the whole thickness of the body portion.

(Method of Producing the Multi-Layer Container)

The multi-layer container of the present invention is formed by forming a preform having the above multi-layer structure, heating the preform at a high temperature of 105° C. or higher, drawing the preform in the axial direction, blow-drawing the preform in the circumferential and, as required, heat-setting the preform.

The multi-layer preform can be produced by a known molding method, such as a coextrusion-molding method by coextruding, for example, the functional resin and the polyester resin; a coinjection-forming method by injecting the functional resin and the polyester resin simultaneously into a metal mold; a sequential injection method by sequentially injecting the polyester resin, the functional resin and the polyester resin into the metal mold; or a compression-molding method by compression-molding a coextruded molten resin lump of the functional resin and the polyester resin by using a core mold and a cavity mold.

When any one of these systems is employed, the preform that is formed should be in a supercooled state, i.e., in an amorphous state. It is further desired that the intermediate layer of the functional resin is sealed inside the inner layer and the outer layer of the thermoplastic polyester.

It is desired that forming the multi-layer preform and the stretch-blow molding thereof are carried out by the cold parison system described above. However, a hot parison system can also be employed effecting the stretch-blow molding without completely cooling the multi-layer preform that is molded.

Prior to the stretch-blow molding, the preform is preheated up to a stretching temperature by such means as the hot air, infrared-ray heater or high-frequency induction heating. In the present invention, however, it is important to effect the stretch-blowing by heating at a high temperature of 105 to 120° C. and, particularly, 108 to 118° C., which is higher than the temperature in the ordinary stretch-blow molding. That is, when the temperature of the preform is lower than the above temperature, the draw stress of the intermediate functional resin layer increases causing voids to easily occur and, therefore, impairing the transparency of the obtained multi-layer container. When the temperature of the preform is higher than the above range, on the other hand, the preform is softened causing decentering at the time of stretch-blow molding, deteriorating the moldability, losing uniformity in the thickness distribution of the obtained multi-layer container, permitting the preform to be crystallized prior to the stretch-blow molding, and making it difficult to accomplish the molding.

The thus heated preform is fed into a known stretch-blow molding machine, set in the metal mold, stretched in the axial direction by pushing a stretching rod, and is stretched in the circumferential direction by blowing a fluid. Here, in the present invention, it is important to heat the interior of the multi-layer preform by using a heating rod heated at 300 to 600° C. and/or the hot air of 150 to 220° C. and, particularly, 170 to 210° C.

That is, in biaxially stretch-blow molding the preform that is heated in the above temperature range, the heating rod heated at a high temperature is inserted in the preform to heat the interior thereof and/or the hot air of a high temperature is forcibly introduced therein. Therefore, the temperature in the preform becomes high and a high temperature is maintained inside the preform during the stretch-blow molating relaxing the strain, relaxing the strain in the intermediate layer which comprises a functional resin having a high draw stress, suppressing the formation of voids and without impairing the transparency and the function such as gas-barrier property.

In the present invention, it is important that the temperatures of the heating rod and the hot air are in the above ranges. When the temperatures are lower than the above ranges, the interior of the preform is not heated to a sufficient degree and the strain is not efficiently relaxed. When the temperatures are higher than the above ranges, on the other hand, the inner polyester layer or the functional resin is crystallized and whitened or is drawn nonuniformly, or the functional resin layer is drawn nonuniformly deteriorating the formability.

It is desired that the time for heating the interior is varied depending upon the preheating temperature of the preform and the setpoint temperature of the heating rod used for heating the interior. Preferably, the heating time is 8 to 20 seconds and, particularly, 10 to 15 seconds. It is further desired that the hot air used for the stretch-blow molding is forcibly introduced into the preform set in the metal mold for 2 to 3 seconds.

It is desired that the drawing ratio of the multi-layer polyester container which is the final body is 1.5 to 25 times in terms of the area ratio, 1.2 to 6 times in terms of the drawing ratio in the axial direction, and 1.2 to 4.5 times in terms of the drawing ratio in the circumferential direction.

The multi-layer polyester container obtained by the method of the present invention has a degree of crystallinity of the inner polyester layer of not less than 25% which is comparable to the orientation and degree of crystallinity of a container obtained by stretch-blow molding a single-layer preform under the ordinary conditions.

The stretch-blow molded bottle can be heat-set by known means. The heat-setting can be effected by a one-molding method, in a blow-molding metal mold, or by a two-molding method using a heat-setting metal mold separate from the blow-molding metal mold. The temperature for heat-setting is, desirably, in a range of 100 to 200° C.

As another stretch-blow molding, there can be exemplified a two-step stretch-blow molding according to which the preform is formed into a primary blow-molded body of a size larger than the finally blow-molded body by using a primary blow metal mold, the primary blow-molded body is heat-shrunk followed by a biaxial stretch-blow molding by using the secondary blow metal mold to obtain a final blow-molded body as taught in Japanese patent No. 2917851 assigned to the present applicant. According to this stretch-blow molding, a blow-molded body is obtained having a bottom portion which is drawn to possess a decreased thickness to a sufficient degree, and featuring excellent deformation and shock resistance at the time of hot-filling and sterilization by heating.

When conducting the above two-step stretch-blow molding, too, according to the present invention, it is important to heat the interior by using the heating rod heated at 300 to 600° C. and/or using the hot air of 150 to 220° C. at the time of the primary blow.

The multi-layer container of the present invention is not limited to the above-mentioned biaxially stretch-blow molded bottle only but may be a stretch-molded multi-layer container of the shape of a cup or the like so far as the difference of tan δ of the inner polyester layer at 80° C. and 60° C. is 0.035 or less in the measurement of the viscoelasticity at 0.5 Hz. That is, a cup-like multi-layer plastic container having at least the body portion that is drawn can be produced by employing means for relaxing the distortion in the inner polyester layer in producing a multi-layer sheet using the functional resin as the intermediate layer and the thermoplastic polyester as the inner and outer layers and in subjecting the multi-layer sheet to the vacuum forming, compressed-air forming, draw forming or plug-assisted forming, or in producing a multi-layer preform and in subjecting the multi-layer preform to the biaxial stretch-blow molding.

Depending upon the functional resin used for the intermediate layer, the multi-layer polyester container of the present invention exhibits various functions such as gas-barrier property, oxygen-absorbing property and water vapor-barrier property, and is useful as a container capable of, for example, preventing flavor of the content from being deteriorated by oxygen. The contents that can be filled may be such beverages as beer, wine, fruit juice, carbonated soft drinks, and carbonated beverages containing fruit juice, such foods as fruits, nuts, vegetables, meats, infant's foods, coffee, jam, mayonnaise, ketchup, edible oils, dressings, sauces, food boiled down in soy, milk products, as well as medicines, cosmetics and gasoline, which are subject to be degraded in the presence of oxygen though not limited thereto only.

EXAMPLES

The invention will be further described by way of the following Examples to which only, however, the invention is in no way limited.

[Measurement of Draw Stress of Functional Resins]

An injection-formed plate of a functional resin having a thickness of 1.5 mm was biaxially drawn by using a biaxial draw tester (manufactured by Toyo Seiki Seisaku-sho. Ltd.) at a temperature of 115° C., at a drawing rate of 2.5 m/min, at a ratio of 3 times long and 3 times wide to measure the draw stress by using a stress measuring instrument attached to the biaxial draw tester.

[Measurement of Difference δ]

A test piece 1 cm wide and 2 cm long was cut out from a position 10 mm under the lower end of the neck portion of the formed multi-layer container along the shape of the shoulder portion, and only the innermost polyester film layer of a thickness of 100 μm was stripped off. The test piece thus stripped off was measured for its tan δ by using a viscoelasticity measuring apparatus [EXSTAR 6000 SERIES-DMS 6100 manufactured by SII NanoTechnology Inc.] under the measuring conditions of a test piece gauge length of 10 mm, vibration of 0.5 Hz, strain amplitude of 10 μm, minimum tension/compression force of 200 mN and elevating the temperature at a rate of 5° C. a minute. The values of tan δ at 60° C. and 80° C. were read from the obtained spectra, and a difference therebetween was found.

[Measurement of Internal Haze]

A test piece 30 mm wide and 40 mm long was cut out from the center of the body portion of the formed multi-layer container. The intermediate functional resin layer only was stripped off the test piece, and a paraffin liquid was thinly applied onto the surface thereof in order to remove the external haze. Thereafter, the haze (%) was measured by using the S&M Colour Computer, Model SM-4, manufactured by Suga Test Instruments Co., Ltd.

[Measurement of Oxygen Transmission Coefficient]

A test piece 13 cm wide and 9 cm long was cut out from the body portion of the formed multi-layer container. The intermediate functional resin layer only was stripped off the test piece and was measured for its oxygen transmission factor (ml·mm/day·atm) by using an oxygen transmission analysis system, OX-TRAN 2/20, manufactured by Mocon Inc. under the conditions of a temperature of 40° C. and a relative humidity of 90% RH, and an oxygen transmission coefficient (ml·mm/m²·day·atm) was calculated from the thickness (mm) of the sample that has been measured in advance.

[Measurement of Water Vapor Transmission Coefficient]

A test piece 13 cm wide and 9 cm long was cut out from the body portion of the formed multi-layer container. The intermediate functional resin layer only was stripped off the test piece and was measured for its water vapor transmission factor (g·mm/day·atm) by using a water vapor permeation analysis system, PERMATRAN-W 3/30, manufactured by Mocon Inc. under the conditions of a temperature of 40° C. and a relative humidity of 90% RH, and a water vapor transmission coefficient (g·mm/m²·day·atm) was calculated from the thickness (mm) of the sample that has been measured in advance.

Example 1

By using a co-injection forming machine provided with three injection machines, i.e., an injection machine (a) for inner and outer PET layers, an injection machine (b) for an intermediate PET layer and an injection machine (c) for a functional resin, a polyethylene terephthalate (PET) resin (RT543CTHP, manufactured by Japan Unipet Co., Ltd.) dried at 150° C. for 4 hours was fed to the injection machines (a) and (b), and a polymetaxylylene adipamide resin (MXD6) (S6121 manufactured by Mitsubishi Gas Chemical Company Inc.) (draw stress: 55 N) was fed as a functional resin to the injection machine (C) in order to mold, by the sequential injection molding, a two-kind-five-layer (a/c/b/c/a) multi-layer preform having inner and outer layers and an intermediate layer, which are PET layers, and intermediate functional resin layers of a functional resin among them. The preform weighed 32 g and in which the ratio of the functional resin was 5% of the whole film thickness.

Next, by using a quartz heater, the preform was preheated from the outer side up to a surface temperature of 113° C., was stretch-blow molded by using the compressed air heated at 150° C. to mold a two-kind-five-layer multi-layer bottle having a capacity of 530 ml and various layers in the body portion, i.e., innermost PET layer (100 μm)/inner functional resin layer (11 μm)/intermediate PET layer (180 μm)/outer functional resin layer (11 μm)/outer PET layer (150 μm).

A sample was cut out from near the lower part of the neck of the obtained bottle to measure tan δ. Further, a sample was cut out from the body portion to measure the internal haze and the oxygen transmission coefficient.

Example 2

A multi-layer preform and a multi-layer bottle were molded in the same manner as in Example 1 but using, as a functional resin, a resin composition (draw stress: 70 N) obtained by melt-kneading a polymetaxylylene adipamide [T630 manufactured by Toyo Boseki Co.] and 3% by weight of a natural montmorillonite that has been organically treated by using a twin extruder, heating the preform by inserting an iron core heated at 530° C. in the preform for 10 seconds at the time of preheating the preform, and blowing the air by using the compressed air of room temperature.

The obtained bottle was measured in the same manner as in Example 1.

Example 3

A multi-layer preform and a multi-layer bottle were molded in the same manner as in Example 2 but heating the obtained preform up to 116° C. by using the quartz heater and stretch-blow molding the preform by using the hot air heated at 190° C. without heating the interior by the iron core.

The obtained bottle was measured in the same manner as in Example 2.

Example 4

A multi-layer preform and a multi-layer bottle were molded in the same manner as in Example 2 but using, as a functional resin, a resin composition (draw stress: 65 N) obtained by melt-kneading an ethylene/vinyl alcohol copolymer (EVOH) (Evar F101, manufactured by Kuraray-Eval Company) and 3% by weight of a natural montmorillonite that has been organically treated by using a biaxial extruder.

The obtained bottle was measured in the same manner as in Example 2.

Example 5

A multi-layer preform and a multi-layer bottle were molded in the same manner as in Example 3 but using, as a functional resin, a cyclic olefin copolymer (COC) [APL6509T, manufactured by Mitsui Chemicals, Inc.] (draw stress: 100 N or more) and heating the obtained preform by inserting the iron core heated at 530° C. in the preform for 15 seconds.

The obtained bottle was measured in the same manner as in Example 3.

Example 6

A multi-layer preform and a multi-layer bottle were molded in the same manner as in Example 3 but preheating the preform from the outer side up to a surface temperature of 105° C. by using the quartz heater and stretch-blow molding the preform by using the hot air heated at 220° C.

The obtained bottle was measured in the same manner as in Example 2.

Example 7

A multi-layer preform and a multi-layer bottle were molded in the same manner as in Example 2 but preheating the preform from the outer side up to a surface temperature of 112° C. by using the quartz heater, heating the preform by inserting the iron core heated at 300° C. in the preform for 20 seconds at the time of preheating the preform, and stretch-blow molding the preform by using the hot air heated at 150° C.

The obtained bottle was measured in the same manner as in Example 2.

Example 8

A multi-layer preform and a multi-layer bottle were molded in the same manner as in Example 2 but preheating the preform from the outer side up to a surface temperature of 120° C. by using the quartz heater, heating the preform by inserting the iron core heated at 600° C. in the preform for 8 seconds at the time of preheating the preform, and stretch-blow molding the preform by using the hot air heated at 150° C.

The obtained bottle was measured in the same manner as in Example 2.

Comparative Example 1

A multi-layer preform and a multi-layer bottle were molded in the same manner as in Example 1 but heating the preform at 98° C. by using the quartz heater. The barrier layer of the obtained bottle was whitened.

The obtained bottle was measured in the same manner as in Example 1.

Comparative Example 2

A multi-layer preform and a multi-layer bottle were molded in the same manner as in Example 2 but heating the preform at 100° C. by using the quartz heater, and without heating the interior of the preform by inserting the iron core heated at 530° C. The barrier layer of the obtained bottle was whitened.

The obtained bottle was measured in the same manner as in Example 2.

Comparative Example 3

A multi-layer preform and a multi-layer bottle were molded in the same manner as in Example 4 but heating the preform at 95° C. by using the quartz heater. The barrier layer of the obtained bottle was whitened.

The obtained bottle was measured in the same manner as in Example 4.

Comparative Example 4

A multi-layer preform and a multi-layer bottle were molded in the same manner as in Example 5 but heating the preform at 100° C. by using the quartz heater. The barrier layer of the obtained bottle was whitened.

The obtained bottle was measured in the same manner as in Example 5.

Comparative Example 5

A multi-layer preform and a multi-layer bottle were molded in the same manner as in Example 2 but heating the preform at 105° C. by using the quartz heater and heating the preform by inserting the iron core heated at 250° C. in the preform for 10 seconds at the time of preheating the preform. The barrier layer of the obtained bottle was whitened.

The obtained bottle was measured in the same manner as in Example 2.

Comparative Example 6

The preform was heated at 130° C. by using the quarts heater and was further heated by inserting the iron core heated at 530° C. in the preform for 10 seconds at the time of preheating the preform. However, the preform was crystallized and whitened, and the multi-layer bottle could not be formed.

Comparative Example 7

A multi-layer preform and a multi-layer bottle were molded in the same manner as in Example 3 but heating the preform at 105° C. by using the quartz heater, and draw-blow-forming the preform with the hot air heated at 140° C. without heating the interior by using the iron core. The barrier layer of the obtained bottle was whitened.

The obtained bottle was measured in the same manner as in Example 3.

Comparative Example 8

A multi-layer preform and a multi-layer bottle were molded in the same manner as in Example 3 but heating the preform at 105° C. by using the quartz heater, and draw-blow-forming the preform with the hot air heated at 230° C. without heating the interior by using the iron core. The barrier layer of the bottle exhibited nonuniform thickness distribution and decreased barrier property.

The obtained bottle was measured in the same manner as in Example 3.

Comparative Example 9

A multi-layer preform and a multi-layer bottle were molded in the same manner as in Example 2 but heating the preform at 115° C. by using the quartz heater and heating the preform by inserting the iron core heated at 620° C. in the preform for 10 seconds at the time of preheating the preform. The barrier layer of the bottle exhibited nonuniform thickness distribution and exhibited decreased barrier property.

The obtained bottle was measured in the same manner as in Example 2.

TABLE 1

| | Functional resin | Stress of functional resin (N) | Perform heating temp. (° C.) | Temp of heating body (iron core) (° C.) | Time for inserting heating body (iron core) (S) |
|---|---|---|---|---|---|
| Ex. 1 | MXD6 | 55 | 113 | no | — |
| Ex. 2 | MXD6 + clay | 70 | 113 | 530 | 10 |
| Ex. 3 | MXD6 + clay | 70 | 116 | no | — |
| Ex. 4 | EVOH + clay | 65 | 113 | 530 | 10 |
| Ex. 5 | COC | 100 or more* | 116 | 530 | 15 |
| Ex. 6 | MXD6 + clay | 70 | 105 | no | — |
| Ex. 7 | MXD6 + clay | 70 | 112 | 300 | 20 |
| Ex. 8 | MXD6 + clay | 70 | 120 | 600 | 8 |
| Comp. Ex. 1 | MXD6 | 55 | 98 | no | — |
| Comp. Ex. 2 | MXD6 + clay | 70 | 100 | no | — |
| Comp. Ex. 3 | EVOH + clay | 65 | 95 | 530 | 10 |
| Comp. Ex. 4 | COC | 100 or more* | 100 | 530 | 15 |
| Comp. Ex. 5 | MXD6 + clay | 70 | 105 | 250 | 10 |
| Comp. Ex. 6 | MXD6 + clay | 70 | 130 | 530 | 10 |
| Comp. Ex. 7 | MXD6 + clay | 70 | 105 | no | — |
| Comp. Ex. 8 | MXD6 + clay | 70 | 105 | no | — |
| Comp. Ex. 9 | MXD6 + clay | 70 | 115 | 620 | 10 |

| | Hot air (° C.) | Difference of tan δ | Int. haze of barrier layer (%) | Water vapor transmission coefficient (g · mm/m² · day · atm) | Oxygen transmission coefficient (ml · mm/m² · day · atm) |
|---|---|---|---|---|---|
| Ex. 1 | 150 | 0.030 | 1.5 | — | 0.071 |
| Ex. 2 | no | 0.014 | 3.3 | — | 0.054 |
| Ex. 3 | 190 | 0.021 | 2.6 | — | 0.050 |
| Ex. 4 | no | 0.018 | 4.6 | — | 0.028 |
| Ex. 5 | 190 | 0.015 | 2.2 | 0.085 | — |
| Ex. 6 | 220 | 0.017 | 3.0 | — | 0.057 |
| Ex. 7 | 150 | 0.012 | 3.2 | — | 0.060 |
| Ex. 8 | 150 | 0.014 | 3.1 | — | 0.055 |
| Comp. Ex. 1 | 150 | 0.051 | 10.4 | — | 0.824 |
| Comp. Ex. 2 | no | 0.056 | 25.3 | — | 1.690 |
| Comp. Ex. 3 | no | 0.039 | 15.3 | — | 0.103 |
| Comp. Ex. 4 | 190 | 0.037 | 23.5 | 0.893 | — |
| Comp. Ex. 5 | no | 0.040 | 16.6 | — | 0.317 |
| Comp. Ex. 6 | no | | Preform was crystallized and could not be formed. | | |
| Comp. Ex. 7 | 140 | 0.060 | 18.2 | — | 0.954 |
| Comp. Ex. 8 | 230 | 0.015 | 9.3 | — | 0.426** |
| Comp. Ex. 9 | no | 0.014 | 7.1 | — | 0.553** |

*Functional resin COC used in Ex. 5 and Comp. Ex. 4 possessed a glass transition point (Tg) which was so high that a max. limit valve (100N) of stress measuring instrument of the biaxial drawing apparatus was exceeded.
**Thickness of barrier layer of bottle was not uniform.

The invention claimed is:

1. A multi-layer polyester container comprising inner and outer layers of a polyester resin and at least one intermediate layer of a functional resin, wherein a difference of tan δ of said inner polyester layer at 80° C. and 60° C. is 0.035 or less in the measurement of the viscoelasticity thereof at 0.5 Hz, wherein the multi-layer polyester container is produced by biaxially stretch-blow molding a multi-layer preform which comprises inner and outer layers of a polyester resin and at least one intermediate layer of a functional resin, wherein in conducting the biaxial stretch-blow molding, the multi-layer preform is heated at a temperature of 105 to 120° C., and the multi-layer preform is internally heated by using a heating body heated at 300 to 600° C. and/or hot air of 150 to 220° C.

2. The multi-layer polyester container according to claim 1, wherein said functional resin has a maximum value of draw stress of 50 N or more when an injection-molded plate thereof having a thickness of 1.5 mm is drawn at 115° C.

3. The multi-layer polyester container according to claim 1, wherein said functional resin contains an ethylene/vinyl alcohol copolymer or a polymetaxylylene adipamide as a base resin.

4. The multi-layer polyester container according to claim 1, wherein said functional resin contains a clay dispersed therein.

5. The multi-layer polyester container according to claim 1, wherein said functional resin is a cyclic olefin resin.

6. A method of producing a multi-layer polyester container by biaxially stretch-blow molding a multi-layer preform which comprises inner and outer layers of a polyester resin and at least one intermediate layer of a functional resin, wherein in conducting the biaxial stretch-blow molding, the multi-layer preform is heated at a temperature of 105 to 120° C., and the multi-layer preform is internally heated by using a heating body heated at 300 to 600° C. and/or hot air of 150 to 220° C.

7. The method of producing a multi-layer polyester container according to claim 6, wherein said functional resin has a maximum value of draw stress of 50 N or more when an injection-molded plate thereof having a thickness of 1.5 mm is drawn at 115° C.

8. The method of producing a multi-layer polyester container according to claim 6, wherein a difference of tan δ of the inner polyester layer at 80° C. and 60° C. is 0.035 or less in the measurement of the viscoelasticity thereof at 0.5 Hz.

9. The method of producing a multi-layer polyester container according to claim 6, wherein the preform is heated uniformly.

10. The method of producing a multi-layer polyester container according to claim 6, wherein the entire preform is heated.

\* \* \* \* \*